Patented Aug. 24, 1948

2,447,867

UNITED STATES PATENT OFFICE 2,447,867

AZO DYESTUFFS OF THE PYRAZOLONE SERIES

Abby Ware Nies, Bound Brook, N. J., assignor to American Cyanamid Company, New York, N. Y., a corporation of Maine No Drawing. Application September 9, 1944, Serial No. 553,458

5 Claims. (Cl. 260—162)

This invention relates to new azo dyestuffs of the pyrazolone series.

I have found that it is possible to prepare stable diazo compounds by diazotizing 1-(sulfophenyl) - 3 - methyl-amino - 5 - pyrazolones, and that furthermore these diazo compounds are so stable that they may be coupled in alkaline solutions as well as in acid solutions to produce azo dyestuffs. This opens up the possibility of producing azo dyestuffs of the pyrazolone series, some of which could not be prepared by other methods in which pyrazolones are used as coupling components. Notably it is possible to produce such pyrazolone azo dyestuffs in which the diazotized amino pyrazolone is coupled to acylacetic arylides, aroylacetonitriles and 5-pyrazolones. These dyes may be represented by the following formula:

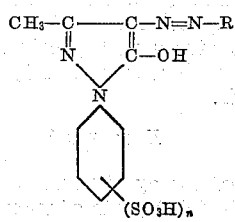

in which R is the residue of the coupling component and $n$ is an integer included in the group consisting of 1 and 2. The phenyl radical may be substituted by additional substituents.

The new dyes included within the scope of the present invention cannot be produced at all without using the new diazo compounds from 1-(sulfophenyl) - 3 -methyl-4-amino-5-pyrazolones. Some other dyestuffs which might theoretically be produced by other methods may be more readily and economically prepared by using these diazo compounds.

The new diazo compounds used in the present invention are not claimed therein but form part of the subject matter of my co-pending application, Serial No. 553,459, filed September 9, 1944, now Patent No. 2,420,791.

Some typical amines suitable for production of these diazo compounds are 1-(4'-sulfophenyl)-3-methyl-4-amino-5-pyrazolone; 1-(3'-sulfophenyl)-3-methyl-4-amino-5-pyrazolone; 1-2',4'-disulfophenyl)-3-methyl-4-amino - 5 - pyrazolone; 1-(2',5'- dichloro-4'- sulfophenyl)- 3 - methyl-4-amino-5-pyrazolone and the like.

The possibility of producing the diazo compounds of 1-(sulfophenyl)-3-methyl-4-amino-5-pyrazolones referred to above would appear to be impossible or impractical. Unsulfonated 1-phenyl-3-methyl-4-amino-5-pyrazolone can only be diazotized by special methods and the product is highly unstable in the presence of alkali. It tends to decompose with the production of keto pyrazolone and rubazonic acid. The possibility of producing diazo compounds by direct diazotization of 1-(sulfophenyl)-3-methyl-4-amino-5-pyrazolones was most surprising and it is even more surprising that the products are stable in both alkaline and acid media and are readily isolated and keep well in the moist or dried state. The production of azo dyestuffs of the present invention is, therefore, not only unexpected but economical.

Many of the dyes which can be prepared by the present invention show desirable new shades and most of them are capable of metallization. The metallized dyes are not specifically claimed in the present case but form a preferred field of utility for the azo dyestuffs of the present invention.

It is an advantage of the present invention that the dyes are produced by conventional coupling methods either in acid or alkaline solution, depending on the nature of the coupling component. Many ordinary coupling components may be used, such as for example, beta-naphthol, 2-naphthol-4-sulfonic acid, 2-naphthol-3-carboxylic acid, 2-naphthol-3,6-disulfonic acid, 2-naphthol-8-sulfonic acid, 1-naphthol-8-sulfonic acid, 1-amino-8-naphthol-4-sulfonic acid, resorcinol and the like.

Of more particular interest in producing the preferred dyes of the present invention are the acylacetic arylides, such as, acetoacetic anilide, acetoacetic para-phenetidide, acetoacetic cresidides, acetoacetic toluidides, acetoacetic xylidides, bis-acetoacetic-o-tolidide, benzoylacetic anilide, acetoacetic-4-sulfoanilide and the like; aroyl acetonitriles such as benzoyl acetonitrile; furthermore, 5-pyrazolones capable of coupling in position 4 such as, 1-phenyl-3-methyl-5-pyrazolone and its derivatives substituted in the phenyl group, e. g., 1-(4'-sulfophenyl)-3-methyl-5-pyrazolone, 1-(4'-sulfophenyl)-3-carboxy-5-pyrazolone, 1-(4'-sulfophenyl)-3-carbethoxy-5-pyrazolone.

Aromatic amines or diamines capable of coupling ortho to the amino group may also be used. Typical examples are beta-naphthylamine, 2-naphthylamine-3,6-disulfonic acid, meta-phenylene diamine, etc. The resulting azo dyestuffs are not obtainable in the majority of cases by the procedure wherein a pyrazolone is used as a coupling component.

The resulting dyestuff may also be a dis or poly-azo dyestuff; thus, resorcinol or meta-phenylene diamine may be coupled first with another diazo compound and then with one of the pyrazolone-diazo compounds used in the invention, or they may be coupled twice with the latter.

The preferred dyestuffs of the present invention and many others which may be obtained by the process of the present invention may be converted into stable metal complexes, provided the coupling component used couples ortho to a hydroxyl or amino group. Some of the unmetallized dyestuffs are decomposed by boiling with strong acid, particularly if the ortho substituent of the coupling component shows a tendency to ketonization. However, in spite of this fact, most of them may be metallized in acid media, the metallization occurring faster than the acid decomposition and the resulting metallized dyes are stable to acid.

Any of the ordinary metals used in metallizing azo dyestuffs may be employed, such as, for example chromium, copper, cobalt, nickel and iron. The metals may be used separately as metallizing agents or combinations of metals may be used.

Metallization is effected in the normal manner, for example, by refluxing or by heating under pressure an aqueous solution of the azo dyestuff together with salts or other suitable compounds of the metals or mixed metals. Some typical examples of such agents are, for example, chromic hydroxide, chromic acetate, chromic formate, chromic chloride, chromic sulfate, basic chromic sulfate, chromic benzene sulfonate, chromic naphthalene disulfonate, cupric acetate, cupric-ammonium hydroxide, cobaltic ammonium chloride, nickel ammonium sulfate, basic ferric acetate. The metallizing agents may be used in the presence or absence of agents designed to control the pH such as acids, bases and buffers.

Upon completion of metallization, the dyestuffs are isolated by filtration if of limited solubility. Others are salted from the aqueous solution and are isolated by filtration and dried.

The following examples are given to more fully illustrate the process of the present invention and not by way of limitation. All parts are by weight unless otherwise noted.

*Example 1*

To 150 parts of water are added 26.9 parts of 1-(4'-sulfophenyl)-3-methyl-4-amino-5-pyrazolone and 29 parts by weight of 20° Bé. hydrochloric acid. After cooling to 10° C. with ice, 6.9 parts of sodium nitrite dissolved in 100 parts of water are added to a permanent blue endpoint when spotted against standard starch iodide paper. Then the 1-(4'-sulfophenyl)-3-methyl-4-diazo-5-pyrazolone is precipitated by the addition of common salt and isolated by filtration.

The product may be stored in the form of a wet paste as well as dried. It is readily soluble in water, the resulting solutions readily coupling with coupling components. It probably has one of the following formulae:

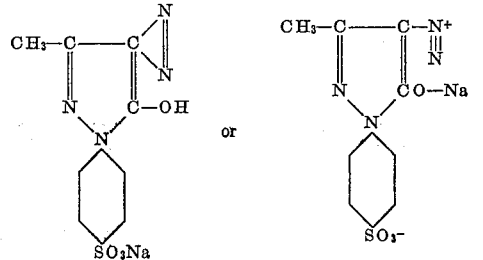

*Example 2*

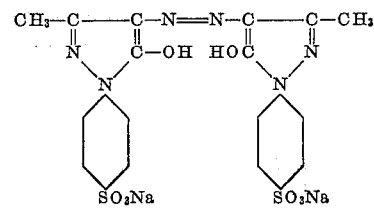

28 parts of 1-(4'-sulfophenyl)-3-methyl-5-pyrazolone are dissolved in 200 parts of water by adding 20% sodium hydroxide solution to a basic test to benzoazurine paper, and 10.6 parts of soda ash. To this solution at room temperature is added 30.2 parts of the dry diazo product of Example 1. The coupling is stirred at room temperature until complete when it is diluted with 600 parts of water and neutralized by the addition of 20° Bé. hydrochloric acid. The dye is precipitated by the addition of common salt, isolated by filtration and dried.

In powder form, the dye is dark brown, dissolving in water to give a red-orange solution. It dissolves in 10% sodium carbonate solution to give a yellow color and also in concentrated sulfuric acid to give a yellow color. It gives red-orange shades on wool when dyed in a sulfuric acid dye bath.

*Example 3*

57.8 parts of the dyestuff prepared in Example 2 are added to 3,000 parts of water and 200 parts of basic chromic acetate solution containing 7.8 parts of chromium. The mixture is boiled several hours when 240 parts of 10% sulfuric acid are added. Boiling is continued until metallization is complete. After cooling, the metallized dye is isolated by filtration and washed with water which has been acidified with hydrochloric acid. The olive green crystals are dried at moderate temperatures.

*Example 4*

5 parts of the metallized dyestuff obtained as described in Example 3 are dissolved in 5,000 parts water with the addition of 1 part of anhydrous sodium carbonate. The solution is diluted with 25,000 parts of water. 40 parts of 10% sulfuric acid are added. In this solution are placed 500 parts of wool which has been wet out. The solution is boiled one and a half hours. Then the wool is removed, washed with water and dried. The dyeings are a full mustard yellow shade of good fastness to light and washing.

Example 5

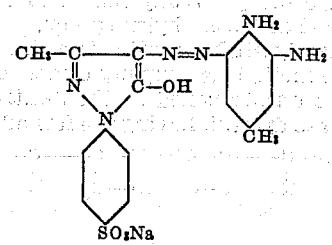

To 275 parts of water at room temperature are added 13.4 parts of 2,4-diamino toluene and 30.2 parts of the diazo compound prepared as in Example 1. The coupling is stirred at room temperature until complete. The dye solution is then made weakly alkaline by adding anhydrous sodium bicarbonate and the dyestuff precipitated by gradually diluting with 20% common salt solution.

The dyestuff is isolated by filtration, washed with 20% common salt solution and dried. It is a dark brown powder, dissolving in water to give an orange-red solution. In 10% sodium carbonate solution it dissolves to form a yellow solution. It dissolves in concentrated sulfuric acid, forming a yellow solution. When dyed in the usual manner in acid dye bath, it produces red shades on wool.

Example 6

42.4 parts of the dyestuff as obtained in Example 5 are dissolved in 1,500 parts of water, heated to boiling and 360 parts of basic chromic acetate solution containing 7.8 parts of chromium are added. Boiling is continued while the acidity is increased, first by adding glacial acetic acid until its final strength in the mixture is 20% and then adding 10% sulfuric acid until the pH is one. Thereafter, boiling is continued sixteen hours. After cooling, the metallized dye is isolated by filtration, washed with water and dried.

It is a red-brown powder, giving a yellow solution in concentrated sulfuric acid.

When dyed on wool using the dyeing procedure of Example 4, brownish orange or rust shades of good fastness to light and washing are obtained. A richer shade is obtained if equal parts of chromic acetate and dye are used in the dye bath.

Example 7

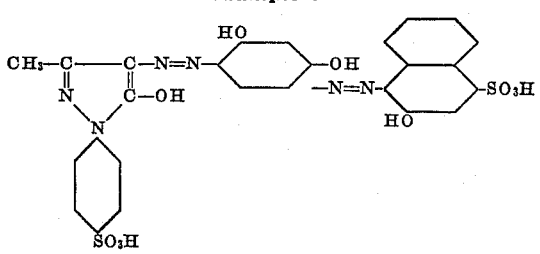

36.0 parts of the monazo dyestuff derived from 1-diazo-2-naphthol-4-sulfonic acid and resorcinol are dissolved in 530 parts of 10% sodium carbonate solution. To this solution are gradually added, at room temperature, 33.2 parts of the diazo product prepared according to Example 1. When the coupling is complete, it is diluted with 100 parts of 20% common salt solution, and the new diazo dye is precipitated by the addition of concentrated hydrochloric acid until a weak acid test on methyl red yellow paper is obtained. The dye slurry is then digested to flocculate it and is cooled. The disazo dyestuff is isolated by filtration, washed with 20% common salt solution and dried.

The dyestuff is dark grey in powder form, dissolving in water to form a violet black solution. In 10% sodium carbonate solution, it dissolves to form a green-black solution and in concentrated sulfuric acid to form a green solution.

Example 8

10 parts of the disazo dyestuff prepared in Example 7 are dissolved in 5,000 parts water and 50 parts of Glauber's salt added. The solution is diluted with 25,000 parts of water and 20 parts of acetic acid added. 500 parts of wool which has been made wet are entered and the dye bath boiled for a half hour. Thereupon an additional 20 parts of acetic acid are added and boiling continued a half hour longer. The wool is then removed from the dye bath, washed with water and dried. The shade is a full blue-black.

Example 9

6.4 parts of the diazo dye prepared in Example 7 are dissolved in 400 parts of water and the solution heated to 95° C. 7.8 parts of chromic chloride dissolved in 44 parts of hot water, containing 1.56 parts of chromium are added and the mixture boiled twenty-four hours. After cooling, the metallized dye is isolated by filtration and washed with water which has been acidified with hydrochloric acid.

It is a black powder, soluble in water to a blue-black solution, soluble in 10% soda ash solution to a green-black and soluble in concentrated sulfuric acid to a dark green.

When dyed on wool using the procedure of Example 4, a black shade is obtained.

Example 10

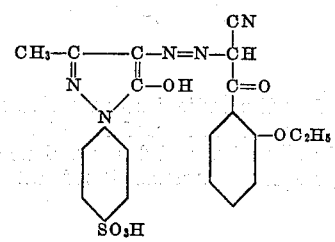

20.8 parts of 2-ethoxybenzoylacetonitrile (40% paste) are dissolved in 160 parts of 5% sodium hydroxide solution. Then 21.2 parts of sodium carbonate are added and the mixture is cooled to 10° C. with ice.

30.2 parts of the monosodium salt of 1-(4'-sulfophenyl)-3-methyl-4-diazo-5-pyrazolone from Example 1 (40% paste) are then added and the mixture stirred until coupling is complete.

The coupling is then diluted with 500 parts of water and concentrated hydrochloric acid added until the solution is weakly acid. The solution is then clarified and the dyestuff precipitated from the filtrate by salting. The dyestuff is then isolated by filtration and dried.

The dyestuff is a brown powder, soluble in water forming a red orange solution. It is also soluble in 5% sodium carbonate solution, in dilute hydrochloric acid solution and in concentrated sulfuric acid, forming yellow solutions.

Example 11

46.9 parts of the free acid of the azo dyestuff prepared in Example 10 are dissolved in 2000 parts of water. 450 parts of a solution of basic chromic acetate containing 15.6 parts of chromium are added and the mixture boiled for thirty minutes. Then 118 parts of 10% sulfuric acid solution are added and boiling continued until metallization is complete. The mixture is then cooled and the insoluble metallized dye isolated by filtration, washed with water and dried.

The dried metallized dyestuff is greenish in color, dissolving in 10% sodium carbonate solution to form an amber colored solution and in concentrated sulfuric acid to form a greenish yellow solution.

When this chromiferous dyestuff is dyed on wool using the dyeing procedure described in Example 4, level reddish yellow shades of good fastness are obtained.

*Example 12*

By similar procedures to those described in the preceding examples, other azo dyes are obtained which, when metallized in situ or on animal fiber, give colors of good fastness as tabulated below:

| Azo Combination: 1-(4'-sulfophenyl)-3-methyl-4-diazo-5-pyrazolone coupled to— | Preformed Metallized Dye | |
|---|---|---|
| | Metal | Shade on Wool |
| 1. 2-Naphthol | Cu | Orange. |
| Do | Co | Reddish orange. |
| Do | Cr | Red on leather. |
| Do | Ni | Orange. |
| 2. 2-Naphthol-4-sulfonic acid | Cr | Pink. |
| 3. 2-Naphthol-3-carboxylic acid | Cr | Red. |
| 4. β-Naphthylamine | Cr | Brownish orange. |
| 5. 1-Naphthol-8-sulfonic acid | Cr | Red-violet. |
| 6. 1-Amino-8-naphthol-4-sulfonic acid (Alk) | Cr | Violet. |
| 7. Acetoacetanilide | Cr | Yellow. |
| 8. 1-Phenyl-3-methyl-5-pyrazolone | Cr | Do. |

I claim:
1. An azo dyestuff having the formula:

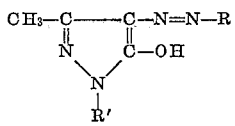

in which R is the radical of an active methylene coupling component selected from the group consisting of acylacetic arylides, aroyl acetonitriles, and 5-pyrazolones unsubstituted on the 2-nitrogen, and R' is a sulfonated phenyl radical, the azo linkage being directly joined to the carbon atom of said active methylene group.

2. An azo dyestuff according to claim 1 in which the active methylene coupling component is a 5-pyrazolone unsubstituted on the 2-nitrogen.

3. The azo dyestuff having the formula:

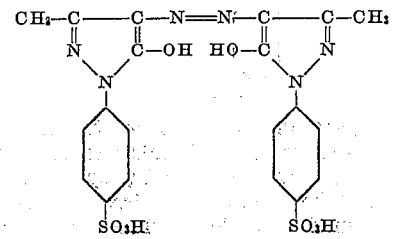

4. An azo dyestuff according to claim 1 in which the active methylene coupling component is an acetoacetic arylide.

5. The azo dyestuff having the formula:

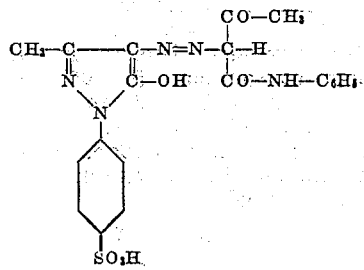

ABBY WARE NIES.

REFERENCES CITED

The following references are of record in the file of this patent:

Heiduschka et al., Jrl. Fur Prak. Chemie, vol. 84, pages 534–535 (1911).

Paul Karrer, Organic Chemistry, page 729 (1938), Nordeman Publishing Co., N. Y.

Beilstein's Handbook, 4th ed., vol. 24, pages 331–332.

Beilstein's Handbuch, 4th ed., vol. 25, pages 551–554.